US012614180B1

(12) United States Patent (10) Patent No.: US 12,614,180 B1

Edwards et al. (45) Date of Patent: Apr. 28, 2026

(54) DYNAMIC PREDICTION OF TRANSACTION PROPERTIES

(71) Applicant: Capital One Services, LLC, McLean, VA (US)

(72) Inventors: Joshua Edwards, Philadelphia, PA (US); Viral Jogani, Moonachie, NJ (US); Oliver Deighton, Vienna, VA (US); Yao Zhang, Westwood, MA (US); Elizabeth Garner, Potomac, MD (US)

(73) Assignee: Capital One Services, LLC, McLean, VA (US)

( * ) Notice: Subject to any disclaimer, the term of this patent is extended or adjusted under 35 U.S.C. 154(b) by 10 days.

(21) Appl. No.: 18/982,497

(22) Filed: Dec. 16, 2024

(51) Int. Cl.
G06Q 20/40 (2012.01)

(52) U.S. Cl.
CPC .................................. G06Q 20/4015 (2020.05)

(58) Field of Classification Search
None
See application file for complete search history.

(56) References Cited

U.S. PATENT DOCUMENTS 10,373,249 B2 * 8/2019 Kanjlia ................. G06Q 20/405
11,151,529 B1 * 10/2021 Nolte ................... G06Q 20/405

11,823,201 B2 * 11/2023 Wintle ................. G06Q 20/405
12,136,122 B2 * 11/2024 Wallace ................. G06N 20/10
2021/0103908 A1 * 4/2021 Mathew ................. G06N 5/046
2021/0406896 A1 * 12/2021 Chaturvedi .......... G06Q 20/405

OTHER PUBLICATIONS

Feb. 12, 2012 (US) Hillebrand, "What's your status when it comes to overdraft coverage?," cfpb, 3 pages.
The Bilt Mastercard®, Pay rent and earn points with no transaction fee—Bilt Rewards, 8 pages, date of publication unknown but, prior to Jun. 26, 2024.
(US) Nov. 19, 2024, Martinez, How to Categorize Transactions For Bank and Credit Card Statements [6 Ways], 17 pages.

* cited by examiner

*Primary Examiner* — Christopher Bridges
(74) *Attorney, Agent, or Firm* — Banner & Witcoff, Ltd.

(57) ABSTRACT

Systems, methods, and apparatuses are described for predicting the identity of significant transactions. A plurality of different transactions may be associated with an account. Those transactions may be filtered and processed (e.g., using a trained machine learning model) to identify one or more significant transactions, such as recurring transactions. Such recurring transaction identification may be performed to generate rules for identifying future recurring transactions. Additionally and/or alternatively, a second machine learning model may be trained to predict the value of recurring transactions in a region.

20 Claims, 5 Drawing Sheets

300

500

| Date | Value | Destination | |
|------|-------|-------------|---|
| Aug. 1 | $2,600 | Landlord | 501 |
| Aug. 12 | $1,000 | Computer Store | 502 |
| Aug. 15 | $10 | Grocery Store | 503 |
| Aug. 17 | $5,000 | Vacation Rental | 504 |
| Aug. 18 | $60 | Restaurant | 505 |

| Date | Value | Destination | Description | |
|------|-------|-------------|-------------|---|
| Sept. 1 | $2,605 | Landlord | | 601 |
| Oct. 1 | $2,650 | Check | Memo: "For 123 Main St." | 602 |
| Nov. 1 | $2,625 | Check | Memo: "Thanks!" | 603 |

FIG. 6

DYNAMIC PREDICTION OF TRANSACTION PROPERTIES

FIELD OF USE

Aspects of the disclosure relate generally to processing data to identify unique transactions. More particularly, aspects described herein describe a process for processing historical transactions to identify properties of unique transactions for particular users/regions.

BACKGROUND

Although a wide variety of financial transactions are conducted electronically, it can be prohibitively difficult to process those transactions to identify critical transactions for the purposes of data security or data science. For example, though it may be desirable to identify a user's rent transaction from amongst past transactions (in no small part because doing so can allow a system to treat those transactions as higher priority, ensure that they are processed quickly and securely, and to process those transactions in accordance with appropriate processing rules), it can be difficult to do so when that user pays their rent inconsistently, when the rent amount is similar to other high-value transactions they regularly conduct, and/or when the payee is not obviously a rental company or similar property-related entity. For example, if a college student pays their rent at the beginning of a semester in one singular payment to their college, it can be difficult to identify such a payment as associated with rent given the lack of frequency, the fact that the recipient is not obviously associated with rent, and the overall amount in question (which might be similar to, for example, a tuition payment). In turn, while it may be desirable to treat such a transaction differently (e.g., require special authentication for the transaction), it may be difficult to do so when the transaction is difficult to identify. Moreover, this difficulty of transaction identification can make understanding the trend of such transactions quite difficult: for example, while it might be desirable to better estimate rent payment trends in a particular geography, it can be difficult to do so when actual rent payments of a particular user cannot be identified and processed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to processing historical transactions (e.g., past transactions conducted by a user) and learning to identify, within those and/or other transactions, certain transactions of interest (e.g., recurring high-value transactions such as rent payments and car payments). As will be described below, this may allow a computing device to dynamically generate rules for identifying those transactions of interest and/or generate machine learning models configured to identify those transactions and/or predict aspects of those transactions (e.g., an average cost of rent in a geographic region). This approach may involve various unique processing steps, such as filtering processes and transaction selection processes. Initially, a filtering step may be performed, whereby noise (e.g., transactions easily identified as not of interest) may be removed. For example, in the context where the system purports to identify high-value recurring rent payments, low-value transactions (e.g., two- or three-dollar transactions at convenience stores) may be identify and removed. As another example, extremely large transactions (e.g., transactions larger than a user's monthly income, such as a purchase of a luxury vehicle in cash) might be removed because they are significantly unlikely to be rent payments or the like. As yet another example, transactions with Merchant Category Codes (MCCs) known to not be associated with rent payments (e.g., MCCs associated with restaurants, bars) may be filtered out. Once filtered, the filtered transactions may be processed to identify one or more likely transactions of interest. As part of this process, the date of transactions may be considered. For example, if a transaction date is close to a predicted date of rent payment (e.g., the first or second of the month), then the transaction might be more likely to be a rent payment. As another example, if a same or similar amount is paid on a recurring basis (e.g., the same or a similar payment every month and/or multiple times a year), then the transaction might be more likely to be a rent payment. Additionally and/or alternatively, as part of this process, the recipient of a transaction may be considered. For example, if a recipient of the transaction is an individual, rental company, or the like, then the transaction might be more likely to be a rent payment. As another example, a computing device may maintain a database of landlords and/or other rent-receiving entities (e.g., as determined by processing public sources such as search engines, social media, or the like) and, if one or more such entities are associated with a transaction, the transaction might be more likely to be a rent payment. Additionally and/or alternatively, as part of this process, the value of a transaction may be considered. For example, transactions having a value close to an average rental value in a geographic region might be more likely to be a rent payment. Once one or more candidate transactions are identified, a likely transaction of interest may be selected. That selected transaction might be used to train a machine learning model to, for example, predict high-volume recurring transactions in a geographical region. Additionally and/or alternatively, that selected transaction might be used to generate a rule to identify similar transactions.

More particularly, a computing device may generate a trained machine learning model by training, using a plurality of historical transactions stored by a transactions database, a first artificial neural network comprising a plurality of nodes to identify one or more candidate high-value recurring transactions. In that example, training the first artificial neural network may comprise modifying one or more weights of the plurality of nodes based on characteristics of the plurality of historical transactions. The computing device may then determine a first plurality of transactions corresponding to an account associated with a geographical region and filter the first plurality of transactions by removing, from the first plurality of transactions, one or more first transactions based on a Merchant Category Code (MCC) corresponding to the one or more first transactions and removing, from the first plurality of transactions, one or more second transactions based on an amount of the one or more second transactions. Then, the computing device may provide, to the trained machine learning model, the filtered first plurality of transactions and receive, as output from the trained machine learning model, an identification of at least two transactions of the filtered first plurality of transactions. The computing device may then generate a second trained machine learning model by training, based on the selected transaction and data associated with the account, a second artificial neural network comprising a second plurality of nodes to predict high-volume recurring transaction amounts in the geographical region. In this example, training the second artificial neural network may comprise modifying one or more second weights of the second plurality of nodes based on characteristics of the selected transaction and the data associated with the account. The computing device may then identify, based on output of the second trained machine learning model, a first high-volume recurring transaction amount for a first geographic region.

The second trained machine learning model may be trained in a variety of ways. For example, the computing device may modify the one or more second weights of the second plurality of nodes further based on one or more third transactions that are high-value recurring transactions, that were conducted at a different date and have a same currency value, and/or that were identified based on a predicted date of a recurring payment. As another example, the computing device may modify the one or more second weights of the second plurality of nodes further based on one or more third transactions, and those one or more third transactions may have been determined by identifying one or more rent transactions, identifying, based on the one or more rent transactions, one or more months without a corresponding rent transaction, and identifying the one or more third transactions by processing at least a portion of the first plurality of transactions corresponding to the one or more months without a corresponding rent transaction to identify one or more likely rent transactions. As yet another example, the computing device may modify the one or more second weights of the second plurality of nodes further based on one or more third transactions (associated with the same or a different account), and those one or more third transactions may have been determined by identifying one or more rent transactions, identifying first transaction descriptions corresponding to the one or more rent transactions, and identifying the one or more third transactions by calculating a similarity distance between the first transaction descriptions and second transaction descriptions for at least a portion of the first plurality of transactions. In some cases, the one or more third transactions may be additionally and/or alternatively determined by identifying the one or more third transactions based on comparing an MCC of the one or more third transactions to a list of known landlord merchants.

Moreover, as will also be detailed below, a computing device may determine a first plurality of transactions corresponding to an account associated with a geographical region and filter the first plurality of transactions by removing, from the first plurality of transactions, one or more first transactions based on a Merchant Category Code (MCC) corresponding to the one or more first transactions and removing, from the first plurality of transactions, one or more second transactions based on an amount of the one or more second transactions. Then, the computing device may identify, from the filtered first plurality of transactions, at least two transactions of the filtered first plurality of transactions based on a history of known recurring transactions corresponding to the account and/or one or more different accounts and select a transaction from the at least two transactions of the filtered first plurality of transactions based on comparing a value of each of the at least two transactions to an average recurring transaction value corresponding to the geographical region (and, e.g., corresponding to one or more different accounts). The computing device may then generate, based on one or more properties of the transaction, one or more rules configured to predict high-volume recurring transaction amounts in the geographical region and identify, based on the one or more rules, a first high-volume recurring transaction amount for a first geographic regions.

In some cases, the computing device may filter transactions to identify transactions of particular interest. For example, the computing device may determine the history of known recurring transactions by identifying high-value recurring transactions associated with the account. Additionally and/or alternatively, the computing device may determine the history of known recurring transactions by identifying at least two different transactions conducted at a different date that comprise a same currency value. Additionally and/or alternatively, the computing device may determine the history of known recurring transactions by identifying one or more rent transactions, identifying, based on the one or more rent transactions, one or more months without a corresponding rent transaction, and identifying the history of known recurring transactions by processing at least a portion of the first plurality of transactions corresponding to the one or more months without a corresponding rent transaction to identify one or more likely rent transactions. Additionally and/or alternatively, the computing device may determine the history of known recurring transactions by identifying one or more rent transactions, identifying first transaction descriptions corresponding to the one or more rent transactions, and identifying the history of known recurring transactions by calculating a similarity distance between the first transaction descriptions and second transaction descriptions for at least a portion of the history of known recurring transactions. Additionally and/or alternatively, the computing device may determine the history of known recurring transactions by identifying a predicted date of a recurring payment. Additionally and/or alternatively, the computing device may determine the history of known recurring transactions based on comparing a Merchant Category Code (MCC) of at least a portion of the history of known recurring transactions to a list of known landlord merchants.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts an illustrative plurality of historical transactions.

FIG. 6 depicts examples of transactions of interest.

DETAILED DESCRIPTION

Figure 1:
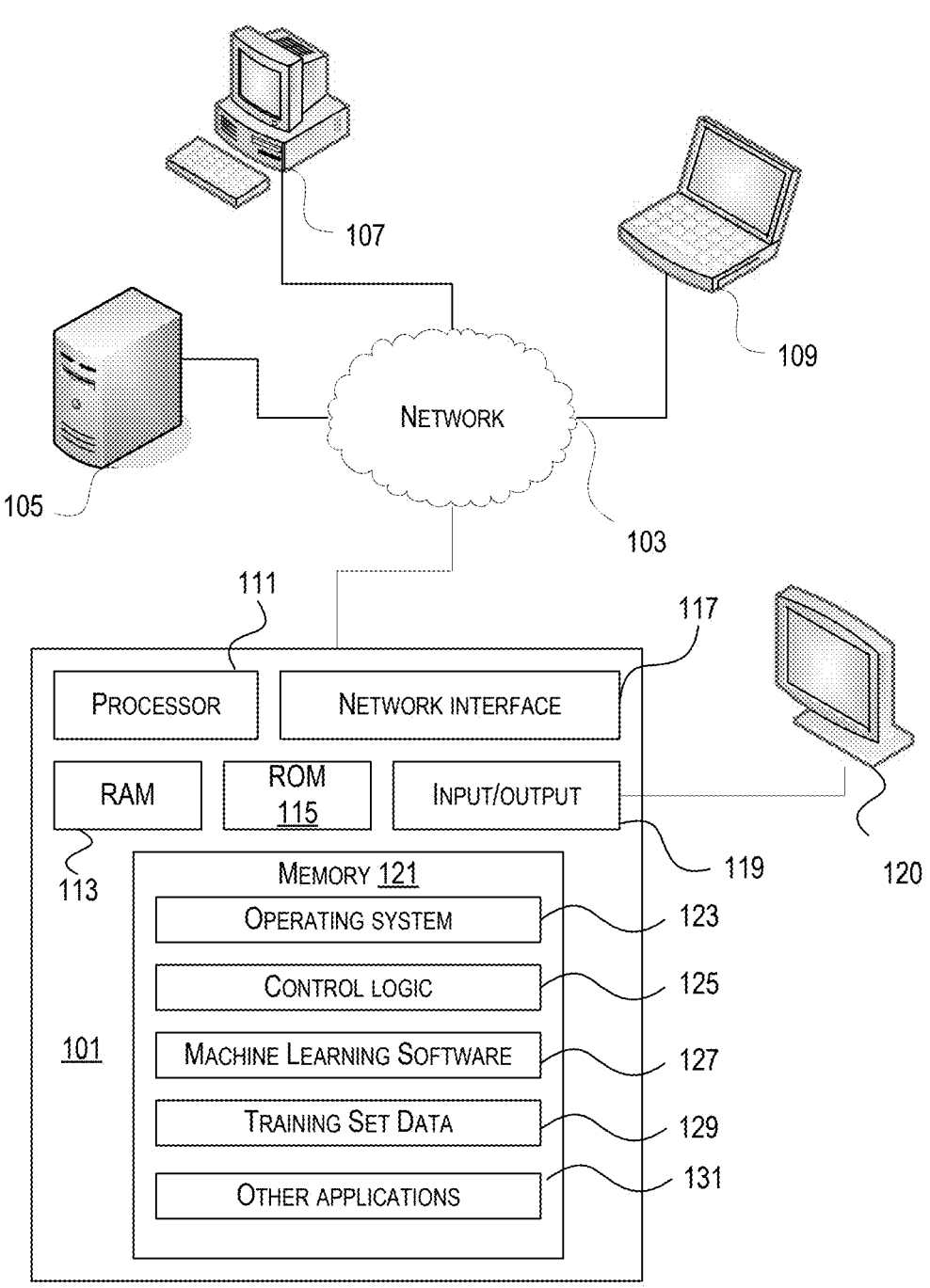
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, it may be desirable to process historical transactions (e.g., past financial transactions) to be capable of identifying transactions of interest (e.g., rent transactions that occur periodically). That said, realistically speaking, it is often the case that such historical transactions do not clearly indicate their purpose: for example, rent transactions might be difficult to identify when paid to unknown individuals or through payment processors. As such, it can be extremely difficult to identify transactions of interest and use information from those transactions for the purposes of managing authorization processes (e.g., making sure that rent transactions are quickly/securely processed), market analysis (e.g., processing a wide variety of local rent transactions to determine an average amount of rent in an area), and the like.

These and other issues are remedied through the steps herein, which provide various processes for filtering and processing historical transactions, identifying transactions of interest, and using those transactions to generate rules, train machine learning models, and the like. For example, as will be described in further detail below, aspects described herein can use two different machine learning models: one might be trained for the purposes of identifying transactions of interest (e.g., identifying rent transactions amongst historical transactions), and another might be trained for the purposes of using those historical rent transactions to generate a model for transactions (e.g., modeling rent costs across different geographic regions). As another example, and as will also be described in further detail below, aspects described herein can use identified transactions of interest to generate rules that can be used to identify similar transactions in the future, even if such transactions would not be easily identified initially. One result of such a process is that a computer can automatically infer the intent of transactions, even when such transactions do not apparently have such intent, and without involvement of humans (e.g., manual reviewers, explanation from the parties to the transaction). In turn, computing devices can perform processes using those identified transactions (e.g., setting up rules for authentication/fraud detection, training machine learning models) without requiring the involvement of a human.

Many of the examples provided herein are from the perspective of rent transactions and rent predictions. Training a rent prediction model can be valuable in multiple ways. Such a rent prediction model may be used to help financial institutions underwrite loans, may be useful to hep real estate investors to know what opportunities are most valuable, and may help developers where to build additional properties. One of the best sources of such rent data may be from financial accounts, such as savings, checking, and/or credit cards. In some cases, rent transactions in such financial accounts can be easy to identify: for example, large-quantity payments to real estate developers for a property matching a customer's address. That said, in other situations, rent information (e.g., transactions to pay rent) might not be as definitive. In such circumstances, more nuanced steps are required to identify rent transactions as compared to, for example, one-off transactions (e.g., large purchases, such as purchases of computers) and the like. This process might involve a wide variety of different confidence levels, which might be used in different circumstances: for example, a higher threshold of confidence for rent transactions might be used for loan underwriting as compared to a threshold used for the purposes of simply estimating rent in a geographical area.

As will be described below, the present disclosure involves multiple possible approaches to filtering and processing transaction data. These processes may be implemented separately, together (e.g., in sequence, in parallel), or the like. For the purposes of illustration, various examples of such processes are provided below.

Aspects described herein may describe using large transactions as a proxy for other, unknown transactions. First, this process would involve identifying one or more accounts that do not have identified transactions of interest (e.g., identifying, for an account, that a rent payment for a particular month has not been identified). Obviously not-of-interest transactions (e.g., small value transactions at restaurants and bars) would then be filtered out. Moreover, transactions associated with merchants not of interest (e.g., payments at gas stations, bars, grocery stores) may also be filtered out. Similarly, transactions at times that are unlikely to be of interest (e.g., payments in the middle of the night at the middle of the month, very unlikely to be rent) could be filtered out. Then, information about deposits could be used to further filter out transactions that are not of interest. For example, if a transaction is significantly larger than an account's monthly deposits, then the likelihood that the transaction is rent is low, as it would suggest that the rent is greater than the income of the accountholder. Once such filtering is performed, various other transactions (e.g., high-value transactions, such as the remaining highest value transactions) could be evaluated to identify a transaction of interest (e.g., likely rent payment). For instance, the highest-value payment made once a month that remains after filtering has performed may be assumed to be a rent payment of interest.

Aspects described herein may describe analyzing transactions based on their amount and frequency. Once filtering (e.g., the filtering described above) is performed, aspects described herein may process a history of transactions to identify transactions that occur with some periodicity (e.g., once a month, once a week). Then, that periodicity may be used to predict such payments even when they have not been identified. For example, if a user usually pays their rent via electronic checks on the first of the month on January, February, April, and May but a similar transaction is not identified in March, then a cash withdrawal in March on the first of the month for the same amount might be assumed to be a rent payment. Additionally and/or alternatively, the date of a transaction relevant to deposit activity may be relevant. For example, it may be assumed that large transactions of interest (e.g., rent payments) are made some time after a deposit is made (e.g., a paycheck is received).

Aspects described herein may describe analyzing transactions based on their transaction descriptions. As part of conducting a transaction, a transaction description (e.g., a memo, a descriptive text field) may be generated. For example, a user might write a paper check and write content in the memo field of that check, and a computing device may use Optical Character Recognition (OCR) to identify the text in that memo field. In turn, that transaction description may be used to identify transactions of interest. For example, transaction descriptions containing words like "car" and "ride" might be likely to be car payments, whereas transaction descriptions containing words like "rent" and "place" and/or indicating specific addresses might be rent payments. To perform this process, a similarity distance may be calculated between one or more words of the transaction description and one or more words associated with a transaction type (e.g., rent, auto, etc.). Along those lines, a pre-trained language learning model (e.g., a trained BERT model) may be used to calculate a likelihood that the transaction description corresponds to a particular transaction type. That association might be used to determine a likelihood that the transaction itself is a transaction of interest.

Aspects described herein may describe analyzing transactions based on their similarity to transactions of interest conducted by other accounts. For example, in the context of rent, an average rent transaction value for a particular location (e.g., a particular city, a particular apartment complex) may be known. In that context, a transaction might be considered to be rent if the value is within two standard deviations of the average rent transaction value. In contrast, in such an example, a transaction might not be considered to be rent if the value is outside of two standard deviations of the average rent transaction value.

Aspects described herein may describe analyzing transactions using databases of known merchants of interest. A database of merchants of interest (e.g., landlords, people renting property) may be generated through processing historical transactions (e.g., based on transactions known to be rent) and/or through public sources (e.g., search engines, social media). For example, a particular individual might be assumed to be a landlord if they periodically receive large payments from one or more other individuals (e.g., if they receive monthly large payments on the first of the month, and especially if those payments contain descriptions like "rent" or the like). In turn, that database may be used to identify transactions likely to be of interest (e.g., likely to be related to rent). The opposite approach may be taken as well: a database of merchants not of interest (e.g., restaurants, grocery stores) may be generated through processing historical transactions and/or public sources, and the database may be used to filter out transactions that are not of interest.

Aspects described herein improve the functioning of computers by allowing computers to identify and process historical and future transactions to infer the intent of a transaction without requiring human involvement in such a process. In turn, aspects described herein allow computers to better generate rules and machine learning models that can operate on such intent and analyze transaction trends without human involvement. Computers cannot perform such steps ordinarily, particularly since transaction data often does not reflect such intent and thus does not readily make itself amenable to filtering and analysis. This process also automates steps (e.g., the identification of whether a transaction is a rent transaction) which, while performable by a human, could not be realistically performed by a human given the volume of data involved (e.g., the need to identify such transactions for thousands, if not millions, of accounts on any given day), the speed of transactions themselves, and the need to analyze large quantities of transactions per account (e.g., it would be difficult for a human to, for each of millions of accounts, iterate through long histories of accounts to identify characteristics of rental transactions). Stated differently, even if some of the processes described herein could be performed by a computer, the aspects described herein use unique computing processes to achieve such a process more efficiently, faster, and in view of the prohibitively large quantities of data that may be involved given modern reliance on electronic transaction processing.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

FIG. 1 also shows that the computing device 101 may comprise a Hardware Security Module (HSM) 132 and/or a Quantum Random Number Generator (QRNG) 133. The HSM 132 may comprise any computing module (e.g., one or more computer chips, attached cards, or the like) which may be capable of managing secrets, performing encryption and/or decryption, and/or otherwise performing security- and/or authentication-related functions. The HSM 132 may comprise, for instance, one or more secure cryptoprocessor chips which are capable of performing cryptographic operations. The QRNG 133 may comprise any computing module (e.g., one or more computer chips, attached cards, or the like) capable of generating a random number. Such a random number might be generated using quantum methods which permit the random number to have a high degree of entropy.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
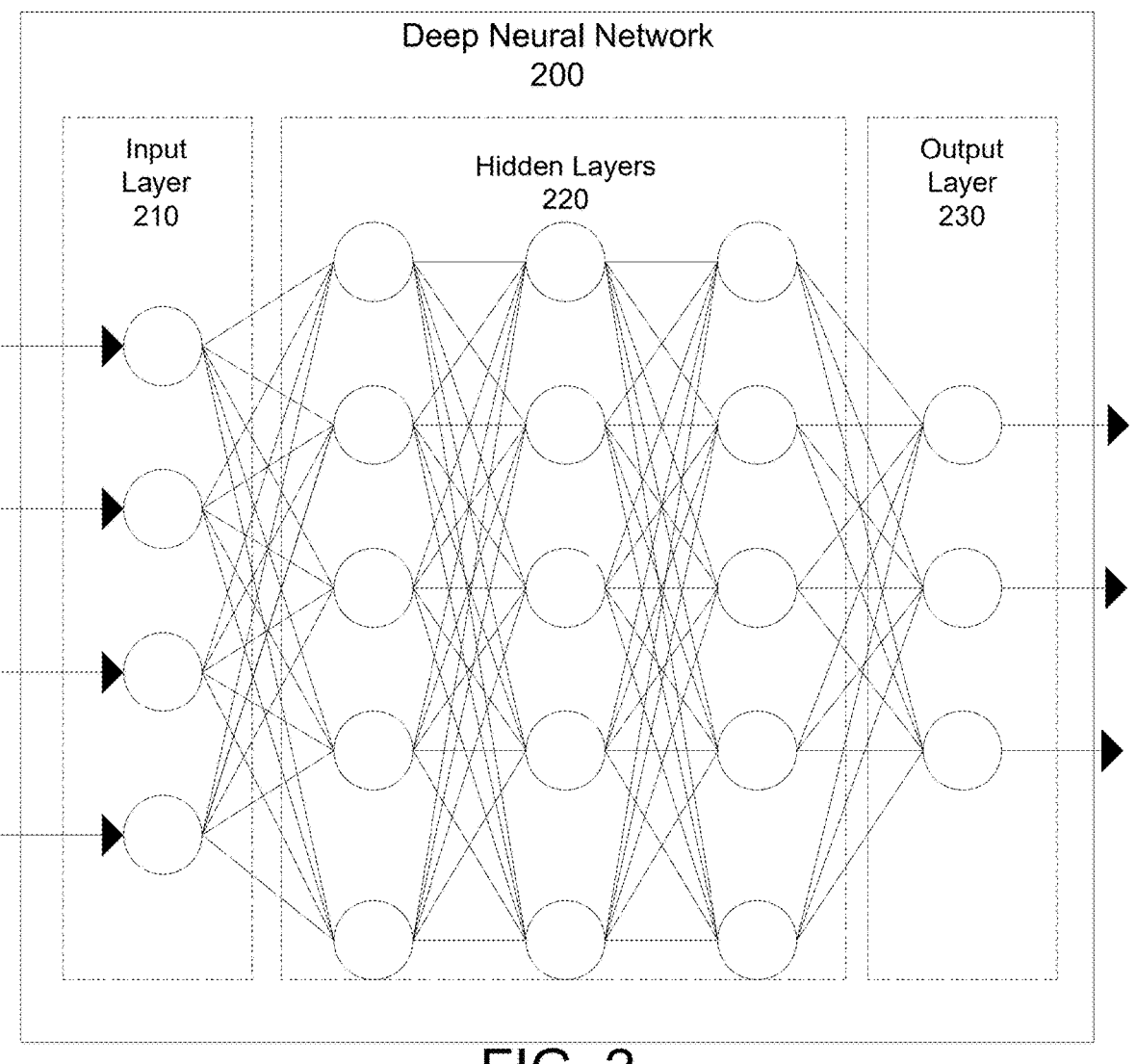
FIG. 2 depicts an example deep neural network architecture for a model according to one or more aspects of the disclosure

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
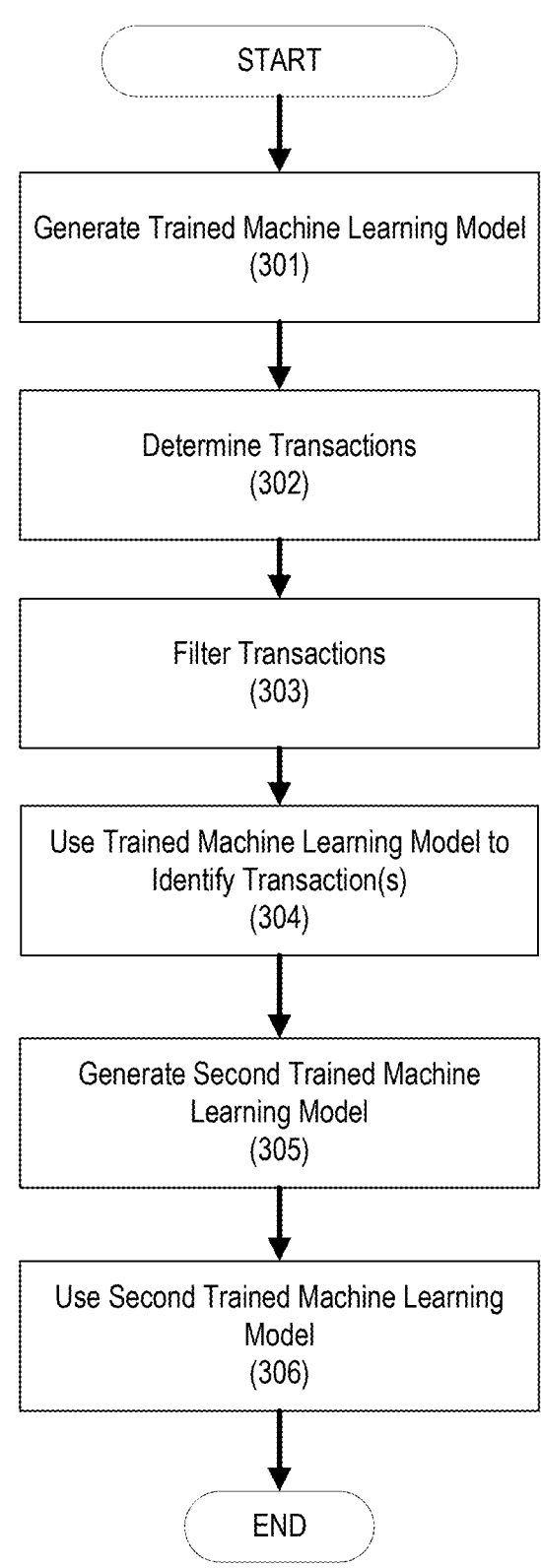
FIG. 3 depicts a method comprising steps for automatically identifying transactions of interest and using those transactions to train a machine learning model.

FIG. 3 depicts a method 300 comprising steps for automatically identifying transactions of interest and using those transactions to train a machine learning model to which may be performed by a computing device, such as any one of the devices described with respect to FIG. 1 and/or FIG. 2. The steps shown in FIG. 3 are illustrative, and may be rearranged, omitted, and/or modified as desired. A computing device may comprise one or more processors and memory storing instructions that, when executed by the one or more processors, cause the performance of one or more of the steps depicted in FIG. 3. One or more non-transitory computer-readable media may store instructions that, when executed, cause the performance of one or more of the steps depicted in FIG. 3.

In step 301, a computing device may generate a trained machine learning model. This process may comprise generating a trained machine learning model to identify transactions of interest by training an artificial neural network (e.g., as described with respect to FIG. 2) examples (e.g., labeled examples) of transactions of interest. For example, the computing device may generate a trained machine learning model by training, using a plurality of historical transactions stored by a transactions database, a first artificial neural network comprising a plurality of nodes to identify one or more candidate high-value recurring transactions. In such an example, the training the first artificial neural network may comprise modifying one or more weights of the plurality of nodes based on characteristics of the plurality of historical transactions. The plurality of historical transactions may be from a variety of different accounts, though they may be selected in some circumstances based on a geography, a similarity of the accounts, etc. For example, the trained machine learning model may be trained based on transactions of interest occurring at a particular time, within a particular geography, or the like. After all, if (for example) the trained machine learning model is designed to identify transactions likely to be rent, then it may be desirable to have different models for New York City rent as compared to rent in a small town.

In step 302, the computing device may determine transactions. The transactions may comprise one or more transactions (e.g., financial transactions, such as credit card payments, debit card payments, check payments, electronic payments) for a one or more accounts. The transactions may be preliminarily filtered based on date (e.g., only recent transactions), account (e.g., only checking account transactions and not credit card transactions), or the like. For example, the computing device may determine a first plurality of transactions corresponding to an account associated with a geographical region.

In step 303, the computing device may filter the transactions. This filtering step may comprise reducing noise from the set of transactions by removing one or more transactions that are not of interest. In many cases, this may involve filtering transactions that can be easily identified as not of interest based on their value, the recipient of the transaction, the date/time of the transaction, or the like. For example, the computing device may filter the first plurality of transactions by performing steps such as removing, from the first plurality of transactions, one or more first transactions based on a Merchant Category Code (MCC) corresponding to the one or more first transactions. Additionally and/or alternatively, the computing device may filter the first plurality of transactions by performing steps such as removing, from the first plurality of transactions, one or more second transactions based on an amount of the one or more second transactions. Additionally and/or alternatively, the computing device may filter the first plurality of transactions by performing steps such as removing transactions that occur before a deposit date (as, for example, rent payments are usually made after a paycheck is received), removing transactions having an excessively high value (e.g., larger than a recent deposit, suggesting a luxury purchase and not a rent payment), or the like.

The computing device may filter the first plurality of transactions by removing transactions associated with known merchants that do not conduct transactions of interest. For example, if the computing device is seeking to identify rent payments, then transactions associated with grocery stores, bars, gas stations, and similar recipients can be filtered out. A database of such recipients may be maintained in either or both of two ways: either as a list of merchants of interest (e.g., places individuals commonly pay rent to), and/or as a list of merchants not of interest (e.g., grocery stores, bars). In the former case, a transaction associated with a merchant of interest might be more likely to be a transaction of interest, whereas in the latter case, a transaction associated with a merchant not of interest might be less likely to be a transaction of interest.

One reason that the transactions may be filtered is for computational efficiency. As will be described below, the transactions may be processed (e.g., using a machine learning model, as described in FIG. 3, and/or using other techniques, as elaborated more in FIG. 4) to identify transactions of interest. By filtering down the number of possible transactions for consideration using a preliminary filtering step (e.g., a rough filter), the overall speed of the processes described herein may be improved.

In step 304, the computing device may use the trained machine learning model to identify transactions of interest. This process may comprise providing the filtered plurality of transactions to the trained machine learning model so that the trained machine learning model can evaluate if any of those filtered plurality of transactions are of interest. Then, output from the trained machine learning model may be evaluated, and one or more transactions of interest may be selected based on that output. For example, the computing device may provide, to the trained machine learning model, the filtered first plurality of transactions, receive, as output from the trained machine learning model, an identification of at least two transactions of the filtered first plurality of transactions, and then select a transaction from the at least two transactions of the filtered first plurality of transactions based on comparing a value of each of the at least two transactions to an average recurring transaction value corresponding to the geographical region.

The output from the trained machine learning model may indicate one or more confidence levels indicating a confidence that a particular transaction is a transaction of interest. In turn, the selection of one or more transactions as a transaction of interest may be based on those one or more confidence levels. For example, the most likely transaction (s) of interest may be selected based on confidence levels.

In step 305, the computing device may generate a second trained machine learning model. The second trained machine learning model may be generated for a variety of purposes: it may be trained to identify similar transactions (e.g., to receive one or more input transactions and output an identity of which, if any, are a transaction of interest), to predict information about an aggregate of transactions (e.g., to be trained based on a variety of input rent transactions to predict rent in a geographic region), or the like. With that said, all or portions of the training data may be based on the transaction(s) identified in step 304. For example, the computing device may generate a second trained machine learning model by training, based on the selected transaction and data associated with the account, a second artificial neural network comprising a second plurality of nodes to predict high-volume recurring transaction amounts in the geographical region. In such an example, training the second artificial neural network may comprise modifying one or more second weights of the second plurality of nodes based on characteristics of the selected transaction and the data associated with the account. The second trained machine learning model may be trained based on transactions for a wide variety of different accounts. For example, the computing device may modify the one or more second weights of the second plurality of nodes further based on one or more third transactions associated with a second account.

The second trained machine learning model may be trained based on high-value recurring transactions. It may be desirable to, as part of training the second trained machine learning model, provide it many examples of transactions of interest. In turn, as part of training the second trained machine learning model, a wide variety of examples of transactions of interest may be provided, whether from the same or a different account. For example, the computing device may train the second artificial neural network by modifying the one or more second weights of the second plurality of nodes further based on one or more third transactions that comprise a high-value recurring transaction.

The second trained machine learning model may be trained based on transactions conducted at a different date but having a same or similar currency value. As indicated above, it may be desirable to train the second trained machine learning model using many examples of transactions of interest, including those at different dates, and whether or not those transactions have identical currency values. After all, the additional data points can better train the model, and there may be benefits to avoiding the circumstance where the data is unnecessarily similar (e.g., the month is the same, the currency values are identical). For example, the computing device may train the second artificial neural network by modifying the one or more second weights of the second plurality of nodes further based on one or more third transactions that were conducted at a different date and comprise a same currency value.

The second trained machine learning model may be trained based on a predicted date of transactions of interest. The computing device may identify transactions of interest based on a date in which they are predicted to occur (e.g., rent payments on the first of the month), and those transactions of interest may be used to train the second trained machine learning model. For example, the computing device may train the second artificial neural network by modifying the one or more second weights of the second plurality of nodes further based on one or more third transactions identified based on a predicted date of a recurring payment.

The second trained machine learning model may be trained by identifying transactions of interest that previously occurred, even if they might not be tagged or otherwise pre-identified. Along those lines, training the second trained machine learning model may comprise identifying a large quantity of transactions of interest (e.g., through the process described above, by inferring other transactions, or the like) and then providing those as training data to the second trained machine learning model. For example, the computing device may modify the one or more second weights of the second plurality of nodes further based on one or more third transactions that were determined by identifying one or more rent transactions, identifying, based on the one or more rent transactions, one or more months without a corresponding rent transaction, and identifying the one or more third transactions by processing at least a portion of the first plurality of transactions corresponding to the one or more months without a corresponding rent transaction to identify one or more likely rent transactions.

The second trained machine learning model may be trained by identifying transactions of interest based on their transaction descriptions. As indicated above, transactions may have transaction descriptions (e.g., a memo field on a check, which may be processed using OCR), and those transaction descriptions may be used to identify transactions of interest for the purposes of training the second trained machine learning model. For example, the computing device may modify the one or more second weights of the second plurality of nodes further based on one or more third transactions that were determined by identifying one or more rent transactions, identifying first transaction descriptions corresponding to the one or more rent transactions, and identifying the one or more third transactions by calculating a similarity distance between the first transaction descriptions and second transaction descriptions for at least a portion of the first plurality of transactions.

The second trained machine learning model may be trained by identifying transactions of interest based on their MCCs. One way that transactions of interest for training the second trained machine learning model may be collected is by identifying transactions associated with MCCs corresponding to known rent recipients (e.g., landlords). For example, the computing device may modify the one or more second weights of the second plurality of nodes further based on one or more third transactions that were determined by identifying the one or more third transactions based on comparing an MCC of the one or more third transactions to a list of known landlord merchants.

In step 306, the computing device may use the second trained machine learning model. This may comprise using the second trained machine learning model to identify future transactions of interest (e.g., in the circumstance where the second trained machine learning model is trained to do so), to identify trends associated with the transaction of interest (e.g., rent trends in a particular geography, for a particular class of user, etc.), or the like. For example, the computing device may identify, based on output of the second trained machine learning model, a first high-volume recurring transaction amount for a first geographic region.

As an introduction, the discussion regarding FIG. 3 above related to a circumstance where a previously-unidentified transaction of interest was identified using machine learning and then used (along with, e.g., other transactions) to train a machine learning model (e.g., to identify such transactions in the future, to identify trends in a market, etc.). Discussion will now turn to a similar circumstance, albeit slightly tweaked. Specifically, rather than explicitly using a machine learning model to identify a transaction of interest, other techniques are discussed. Moreover, that transaction of interest may, in addition to and/or as an alternative to being used to train a machine learning model, be used to generate rules for identifying transactions of interest. While depicted in different figures for ease of explanations, these approaches may be used together or interchangeably. For example, one transaction of interest might be identified using machine learning and another might be identified using other techniques, and both might be provided as training data to a machine learning model. As another example, machine learning techniques may be used to identify transactions of interest which may be used to generate one or more rules for identifying other transactions of interest.

Figure 4:
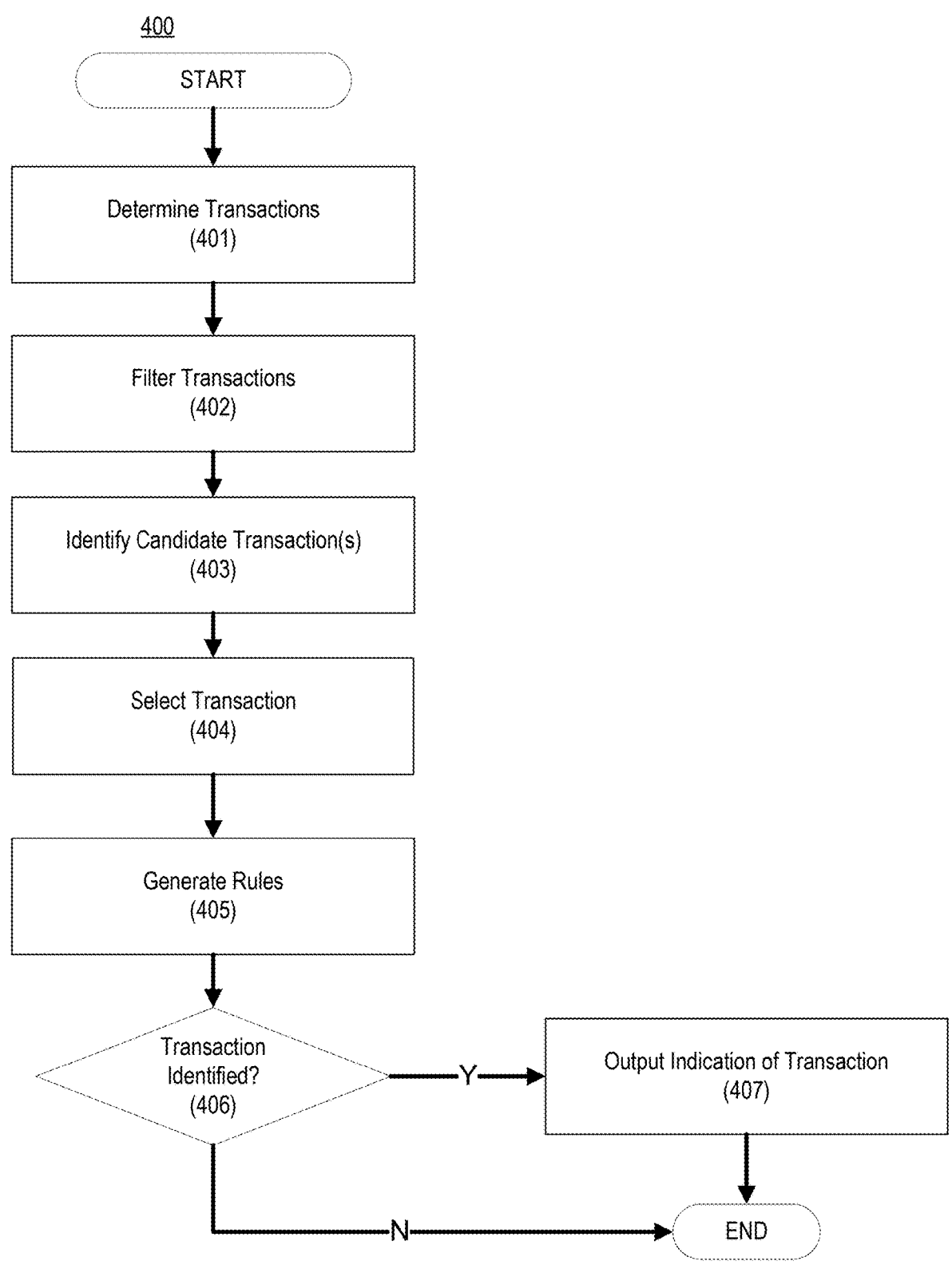
FIG. 4 depicts a method comprising steps for automatically identifying transactions of interest based on historical transaction data.

FIG. 4 depicts a method 400 comprising steps for automatically identifying transactions of interest based on historical transaction data which may be performed by a computing device, such as any one of the devices described with respect to FIG. 1 and/or FIG. 2. The steps shown in FIG. 4 are illustrative, and may be re-arranged, omitted, and/or modified as desired. A computing device may comprise one or more processors and memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 401, a computing device may determine transactions. For example, the computing device may determine a first plurality of transactions corresponding to an account associated with a geographical region. This step may be the same or similar as step 302 of FIG. 3.

In step 402, the computing device may filter the transactions. For example, the computing device may filter the first plurality of transactions by removing, from the first plurality of transactions, one or more first transactions based on an MCC corresponding to the one or more first transactions and removing, from the first plurality of transactions, one or more second transactions based on an amount of the one or more second transactions. This step may be the same or similar as step 303 of FIG. 3.

In step 403, the computing device may identify one or more candidate transactions. This process may comprise identifying, from the filtered transactions, one or more most transactions that are most likely to be transactions of interest. That identification process may be based on historical transactions, such as other transactions of interest that occurred in the past. For example, the computing device may identify, from the filtered first plurality of transactions, at least two transactions of the filtered first plurality of transactions based on a history of known recurring transactions corresponding to the account.

A variety of approaches may be taken for identifying transactions of interest, including the historical transactions of interest. In other words, various approaches may be taken to determine both which transactions in the past were of interest as well as whether a particular transaction of the filtered transactions is of interest. The same approach need not be used for two different transactions; rather, different approaches may be taken based on (for example) the amount of information available, the fidelity of that information, and the like. Various such examples of approaches are provided below.

The computing may determine transactions of interest (including historical transactions of interest) by identifying transactions based on their value. Generally speaking, transactions of interest (e.g., rent transactions) may be identified within a range of values (e.g., not ten dollars, not ten thousand dollars, but typically in the range of one thousand to four thousand dollars). Similarly, such transactions might be identified based on how often they occur (e.g., a rent transaction is often monthly). In turn, transactions of interest may be identified based on their value and/or periodicity. For example, the computing device may determine the history of known recurring transactions by identifying high-value recurring transactions associated with the account.

The computing may determine transactions of interest (including historical transactions of interest) by identifying transactions based on their date. In some cases, transactions of interest may occur on a periodic basis such that they might occur on the same day of the month (e.g., the first of the month, the fifteenth of the month). In turn, transactions of interest may be identified based on their proximity to such dates. For example, the computing device may determine the history of known recurring transactions by identifying at least two different transactions conducted at a different date that comprise a same currency value. Similarly, the computing may determine the history of known recurring transactions based on a predicted date of recurring payments. For example, the computing device may determine the history of known recurring transactions by identifying a predicted date of a recurring payment.

The computing may determine transactions of interest (including historical transactions of interest) by identifying transactions by inferring aspects about past transactions. It may be the case that, for a recurring transaction, past instances of that recurring transaction might not be identified. Inferring the identity of these recurring transactions of interest in the past might help better identify future transactions of interest. For example, the computing device may determine the history of known recurring transactions by identifying one or more rent transactions, identifying, based on the one or more rent transactions, one or more months without a corresponding rent transaction, and identifying the history of known recurring transactions by processing at least a portion of the first plurality of transactions corresponding to the one or more months without a corresponding rent transaction to identify one or more likely rent transactions.

The computing may determine transactions of interest (including historical transactions of interest) based on transaction descriptions. As indicated above, transaction descriptions may contain words or phrases (e.g., "rent," "car payment") which might help identify them as a transaction of interest. These transaction descriptions might be processed to determine a likelihood that a transaction corresponds to a transaction of interest. For example, the computing device may determine the history of known recurring transactions by identifying one or more rent transactions, identifying first transaction descriptions corresponding to the one or more rent transactions, and identifying the history of known recurring transactions by calculating a similarity distance between the first transaction descriptions and second transaction descriptions for at least a portion of the history of known recurring transactions. This process may entail use of a language learning model (e.g., a BERT model) or similar machine learning model configured to determine the distance between one or more words in a transaction description and one or more words associated with a particular category of transaction. In turn, such a language learning model may compute a likelihood that a particular transaction description indicates that the transaction is a transaction of interest.

The computing may determine the history of known recurring transactions based on MCCs. The computing device may store a list of merchants and/or MCCs known to be associated with transactions of interest (e.g., a list of landlords for rent transactions). In turn, that list may be used to identify, where possible, transactions of interest. For example, the computing device may determine the history of known recurring transactions based on comparing an MCC of at least a portion of the history of known recurring transactions to a list of known landlord merchants. The inverse approach may also be taken: a list of merchants and/or MCCs known to not be associated with transactions of interest (e.g., grocers, bars) may be maintained, and that list may be used during a filtering step and/or to lower, during the identification step, the confidence that a particular transaction is a transaction of interest.

Any of the above considerations may cause generation of a confidence value that indicates, for one or more transactions, a confidence that the transaction is a transaction of interest. For example, if the transaction is associated with an MCC associated with a landlord, this may increase the confidence value significantly. On the other hand, if the transaction is for a value lower than one hundred dollars, then the confidence may decrease significantly.

In step 404, the computing device may select a transaction from the one or more candidate transactions. This step may be based on any of the considerations above, including any confidence values determined. For example, the computing device may select a transaction from the at least two transactions of the filtered first plurality of transactions based on comparing a value of each of the at least two transactions to an average recurring transaction value corresponding to the geographical region. The average recurring transaction value may be associated with one or more different accounts.

In step 405, the computing device may generate one or more rules. For example, the computing device may generate, based on one or more properties of the transaction, one or more rules configured to predict high-volume recurring transaction amounts in the geographical region. The rules may be based on one or more aspects of the identified transaction(s), such as their MCCs, their amounts, their location(s), their transaction descriptions, or the like.

In step 406, the computing device may determine whether a transaction was identified based on the one or more rules generated in step 405. This process may comprise using the rule generated in step 405 to identify whether a new transaction is of interest. If a transaction was identified, the method 400 proceeds to step 407. Otherwise, the method 400 ends.

In step 407, the computing device may output an indication of the identified transaction. For example, the computing device may identify, based on the one or more rules, a first high-volume recurring transaction amount for a first geographic region and output the identified first high-volume recurring transaction amount.

Throughout any or all of the processes described in FIG. 3 and FIG. 4, steps may be taken to ensure anonymity. For example, where a machine learning model is being trained to aggregate rent information for a geographic region, then filtering the transactions may additionally and/or alternatively include removing identifying information (e.g., names, addresses, account identifiers) from the transaction data. As another example, rules configured to identify transactions of interest may be limited to and specific to an account and may be secured just like other forms of account data.

FIG. 5 depicts an illustrative plurality of historical transactions 500. Specifically, the plurality of historical transactions 500 comprises a first transaction 501 indicating a $2,500 payment to a landlord on August 1, a second transaction 502 indicating a $1,000 payment to a computer store on August 12, a third transaction 503 indicating a $10 payment to a grocery store on August 15, a fourth transaction 504 indicating a $5,000 payment to a vacation rental on August 17, and a fifth transaction 505 indicating a $50 payment to a restaurant on August 18. This plurality of historical transactions 500 illustrates how, for a financial account, various different transactions may have been conducted across time, with some transactions (e.g., the first transaction 501 to the landlord) being part of a regular set of payments (e.g., for rent), whereas other transactions (e.g., the fourth transaction 504 to the vacation rental) being more irregular (e.g., a payment for a vacation).

FIG. 6 shows examples of transactions of interest. Three requested transactions are depicted: a first transaction 601 for a $2,605 payment to a landlord on September 1, a second transaction 602 for a $2,650 payment to a check on October 1, and a third transaction 603 for a $2,625 payment to a check on November 1. Note that the first transaction does not have a transaction description, but the memo line of the check of the second transaction 602 says "For 123 Main St.," and the memo line of the check of the third transaction 603 says "Thanks!". This information may all be used to determine that all three transactions are transactions of interest (in this example, rent). For example, the first transaction 601 may easily be categorized as a transaction of interest, as it is a large sum payment to a landlord on the first of the month. This information may be used to help determine that the second transaction 602 is also a rent payment: it is for close to the same amount and, although it is a check payment, the memo line indicates an address. In turn, the determination that the first transaction 601 and the second transaction 602 are rent payments may be used to help determine that the third transaction 603 is a rent payment, as it involves a similar amount as past rent transactions, was paid using a similar payment method as a previous rent payment, and appears to be on the same day of the month as other rent payments. Note that these transactions may vary in absolute amount because, for example, the transactions may include payment for utilities-along those lines, the determination that a transaction is not limited to the circumstance where the currency values are the exact same.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to automatically identify high-value recurring transactions based on historical transaction data, the computing device comprising:
   one or more processors; and
   memory storing instructions that, when executed by the one or more processors, cause the computing device to:
      determine a first plurality of transactions corresponding to an account associated with a geographical region;
      filter the first plurality of transactions by:
         removing, from the first plurality of transactions, one or more first transactions based on a Merchant Category Code (MCC) corresponding to the one or more first transactions; and
         removing, from the first plurality of transactions, one or more second transactions based on an amount of the one or more second transactions;
      provide, as input to a first trained machine learning model, at least a portion of the filtered first plurality of transactions, wherein the first trained machine learning model comprises a first artificial neural network trained, using first training data comprising a history of known recurring transactions corresponding to the account, to identify correlations in transactions;
      receive, as output from the first trained machine learning model, an identification of at least two transactions of the filtered first plurality of transactions;
      provide, as input to a second trained machine learning model, the at least two transactions of the filtered first plurality of transactions, wherein the second trained machine learning model comprises a second artificial neural network trained by:
         performing Optical Character Recognition (OCR) on a plurality of document images to identify a plurality of descriptive text elements;
         identifying a plurality of distance values by calculating, using a natural language processing algorithm, a distance between one or more words of each of the plurality of descriptive text elements and one or more target words;
         generating second training data that indicates associations between the descriptive text elements and the plurality of distance values; and
         modifying, based on the second training data, one or more weights of one or more nodes of the second artificial neural network;

receive, as output from the second trained machine learning model, an identification of a transaction from the at least two transactions of the filtered first plurality of transactions;

generate, based on one or more properties of the transaction, one or more rules configured to predict high-volume recurring transaction amounts in the geographical region; and identify, based on the one or more rules, a first high-volume recurring transaction amount for a first geographic region.

2. The computing device of claim 1, wherein the instructions, when executed by the one or more processors, cause the computing device to:

determine the history of known recurring transactions by identifying high-value recurring transactions associated with the account.

3. The computing device of claim 1, wherein the instructions, when executed by the one or more processors, cause the computing device to:

determine the history of known recurring transactions by identifying at least two different transactions conducted at a different date that comprise a same currency value.

4. The computing device of claim 1, wherein the instructions, when executed by the one or more processors, cause the computing device to:

determine the history of known recurring transactions by:

identifying one or more rent transactions;

identifying, based on the one or more rent transactions, one or more months without a corresponding rent transaction; and identifying the history of known recurring transactions by processing at least a portion of the first plurality of transactions corresponding to the one or more months without a corresponding rent transaction to identify one or more likely rent transactions.

5. The computing device of claim 1, wherein the instructions, when executed by the one or more processors, cause the computing device to:

determine the history of known recurring transactions by:

identifying one or more rent transactions;

identifying first transaction descriptions corresponding to the one or more rent transactions; and identifying the history of known recurring transactions by calculating a similarity distance between the first transaction descriptions and second transaction descriptions for at least a portion of the history of known recurring transactions.

6. The computing device of claim 1, wherein the instructions, when executed by the one or more processors, cause the computing device to:

determine the history of known recurring transactions by identifying a predicted date of a recurring payment.

7. The computing device of claim 1, wherein the instructions, when executed by the one or more processors, cause the computing device to:

determine the history of known recurring transactions based on comparing a Merchant Category Code (MCC) of at least a portion of the history of known recurring transactions to a list of known landlord merchants.

8. The computing device of claim 1, wherein the instructions, when executed by the one or more processors, further cause the computing device to generate the one or more rules based on an average recurring transaction value associated with one or more different accounts.

9. A method configured to automatically identify high-value recurring transactions based on historical transaction data, the method comprising:

determining a first plurality of transactions corresponding to an account associated with a geographical region;

filtering the first plurality of transactions by:

removing, from the first plurality of transactions, one or more first transactions based on a Merchant Category Code (MCC) corresponding to the one or more first transactions; and removing, from the first plurality of transactions, one or more second transactions based on an amount of the one or more second transactions;

provide, as input to a first trained machine learning model, at least a portion of the filtered first plurality of transactions, wherein the first trained machine learning model comprises a first artificial neural network trained, using first training data comprising a history of known recurring transactions corresponding to the account, to identify correlations in transactions;

receive, as output from the first trained machine learning model, an identification of at least two transactions of the filtered first plurality of transactions;

providing, as input to a second trained machine learning model, the at least two transactions of the filtered first plurality of transactions, wherein the second trained machine learning model comprises a second artificial neural network trained by:

performing Optical Character Recognition (OCR) on a plurality of document images to identify a plurality of descriptive text elements;

identifying a plurality of distance values by calculating, using a natural language processing algorithm, a distance between one or more words of each of the plurality of descriptive text elements and one or more target words;

generating second training data that indicates associations between the descriptive text elements and the plurality of distance values; and modifying, based on the second training data, one or more weights of one or more nodes of the second artificial neural network;

receiving, as output from the second trained machine learning model, an identification of a transaction from the at least two transactions of the filtered first plurality of transactions;

generating, based on one or more properties of the transaction, one or more rules configured to predict high-volume recurring transaction amounts in the geographical region; and identifying, based on the one or more rules, a first high-volume recurring transaction amount for a first geographic region.

10. The method of claim 9, further comprising:

determining the history of known recurring transactions by identifying high-value recurring transactions associated with the account.

11. The method of claim 9, further comprising:

determining the history of known recurring transactions by identifying at least two different transactions conducted at a different date that comprise a same currency value.

12. The method of claim 9, further comprising:

determining the history of known recurring transactions by:

identifying one or more rent transactions;

identifying, based on the one or more rent transactions, one or more months without a corresponding rent transaction; and identifying the history of known recurring transactions by processing at least a portion of the first plurality of transactions corresponding to the one or more months without a corresponding rent transaction to identify one or more likely rent transactions.

13. The method of claim 9, further comprising:

determining the history of known recurring transactions by:

identifying one or more rent transactions;

identifying first transaction descriptions corresponding to the one or more rent transactions; and identifying the history of known recurring transactions by calculating a similarity distance between the first transaction descriptions and second transaction descriptions for at least a portion of the history of known recurring transactions.

14. The method of claim 9, further comprising:

determining the history of known recurring transactions by identifying a predicted date of a recurring payment.

15. The method of claim 9, further comprising:

determining the history of known recurring transactions based on comparing a Merchant Category Code (MCC) of at least a portion of the history of known recurring transactions to a list of known landlord merchants.

16. The method of claim 9, wherein the average recurring transaction value is associated with one or more different accounts.

17. One or more non-transitory computer-readable media storing instructions configured to automatically identify high-value recurring transactions based on historical transaction data, wherein the instructions, when executed by one or more processors of a computing device, cause the computing device to:

determine a first plurality of transactions corresponding to an account associated with a geographical region;

filter the first plurality of transactions by:

removing, from the first plurality of transactions, one or more first transactions based on a Merchant Category Code (MCC) corresponding to the one or more first transactions; and removing, from the first plurality of transactions, one or more second transactions based on an amount of the one or more second transactions;

provide, as input to a first trained machine learning model, at least a portion of the filtered first plurality of transactions, wherein the first trained machine learning model comprises a first artificial neural network trained, using first training data comprising a history of known recurring transactions corresponding to the account, to identify correlations in transactions;

receive, as output from the first trained machine learning model, an identification of at least two transactions of the filtered first plurality of transactions;

provide, as input to a second trained machine learning model, the at least two transactions of the filtered first plurality of transactions, wherein the second trained machine learning model comprises a second artificial neural network trained by:

performing Optical Character Recognition (OCR) on a plurality of document images to identify a plurality of descriptive text elements;

identifying a plurality of distance values by calculating, using a natural language processing algorithm, a distance between one or more words of each of the plurality of descriptive text elements and one or more target words;

generating second training data that indicates associations between the descriptive text elements and the plurality of distance values; and modifying, based on the second training data, one or more weights of one or more nodes of the second artificial neural network;

receive, as output from the second trained machine learning model, an identification of;

generate, based on one or more properties of the transaction, one or more rules configured to predict high-volume recurring transaction amounts in the geographical region; and identify, based on the one or more rules, a first high-volume recurring transaction amount for a first geographic region.

18. The one or more non-transitory computer-readable media of claim 17, wherein the instructions, when executed by the one or more processors, cause the computing device to:

determine the history of known recurring transactions by identifying high-value recurring transactions associated with the account.

19. The one or more non-transitory computer-readable media of claim 17, wherein the instructions, when executed by the one or more processors, cause the computing device to:

determine the history of known recurring transactions by identifying at least two different transactions conducted at a different date that comprise a same currency value.

20. The one or more non-transitory computer-readable media of claim 17, wherein the instructions, when executed by the one or more processors, cause the computing device to:

determine the history of known recurring transactions by:

identifying one or more rent transactions;

identifying, based on the one or more rent transactions, one or more months without a corresponding rent transaction; and identifying the history of known recurring transactions by processing at least a portion of the first plurality of transactions corresponding to the one or more months without a corresponding rent transaction to identify one or more likely rent transactions.

* * * * *